United States Patent
Hughes et al.

(10) Patent No.: US 6,520,889 B1
(45) Date of Patent: Feb. 18, 2003

(54) ADAPTIVE ENGINE CONTROL FOR SHIFTING TO NEUTRAL

(75) Inventors: Douglas A. Hughes, Wixom, MI (US); Karen L. Marx, Clawson, MI (US)

(73) Assignee: Eaton Corporation, Cleveland, OH (US)

(*) Notice: Subject to any disclaimer, the term of this patent is extended or adjusted under 35 U.S.C. 154(b) by 98 days.

(21) Appl. No.: 09/704,288

(22) Filed: Nov. 1, 2000

(51) Int. Cl.$^7$ ................................................ B60K 41/04
(52) U.S. Cl. ...................................... 477/107; 477/111
(58) Field of Search ................................ 477/107, 110, 477/111, 124; 74/339; 701/54

(56) References Cited

U.S. PATENT DOCUMENTS

| | | | |
|---|---|---|---|
| 4,593,580 A | 6/1986 | Schulze | 74/866 |
| 4,850,236 A | 7/1989 | Braun | 74/337 |
| 5,491,630 A * | 2/1996 | Genise et al. | 180/197 |
| 5,582,558 A | 12/1996 | Palmeri | 477/109 |
| 5,735,771 A | 4/1998 | Genise | 477/111 |
| 5,743,143 A | 4/1998 | Carpenter et al. | 74/335 |
| 5,911,787 A | 6/1999 | Walker | 74/335 |
| 5,950,491 A | 9/1999 | Wadas | 74/335 |
| 5,974,906 A * | 11/1999 | Stine et al. | 477/124 |
| 5,984,831 A * | 11/1999 | Wadas et al. | 477/111 |
| 5,989,155 A * | 11/1999 | Wadas et al. | 477/111 |
| 6,015,366 A | 1/2000 | Markyvech et al. | 477/109 |
| 6,042,504 A * | 3/2000 | Gualtieri et al. | 477/111 |
| 6,095,947 A * | 8/2000 | Genise | 477/111 |
| 6,126,570 A | 10/2000 | Bohm et al. | 477/109 |
| 6,285,941 B1 * | 9/2001 | Janecke | 701/55 |
| 6,358,183 B1 * | 3/2002 | Hughes et al. | 477/111 |
| 6,361,473 B1 * | 3/2002 | Mason et al. | 477/124 |
| 6,461,274 B1 * | 10/2002 | Genise et al. | 477/109 |

* cited by examiner

*Primary Examiner*—Rodney H. Bonck
*Assistant Examiner*—David D. Le
(74) *Attorney, Agent, or Firm*—Kevin M. Hinman

(57) ABSTRACT

A method/system for adaptively controlling engine fueling during disengagement of a jaw clutch (70) while maintaining the vehicle master friction clutch (20) engaged. Engine torque is initially commanded to a zero drive line torque value (114) and, after a period of time ($T_2-T_1$) if non-torque lock is sensed (($d/dt(SL_{Y-Y})$)<REF), than a torque bump (128) engine fueling routine is initiated.

18 Claims, 7 Drawing Sheets

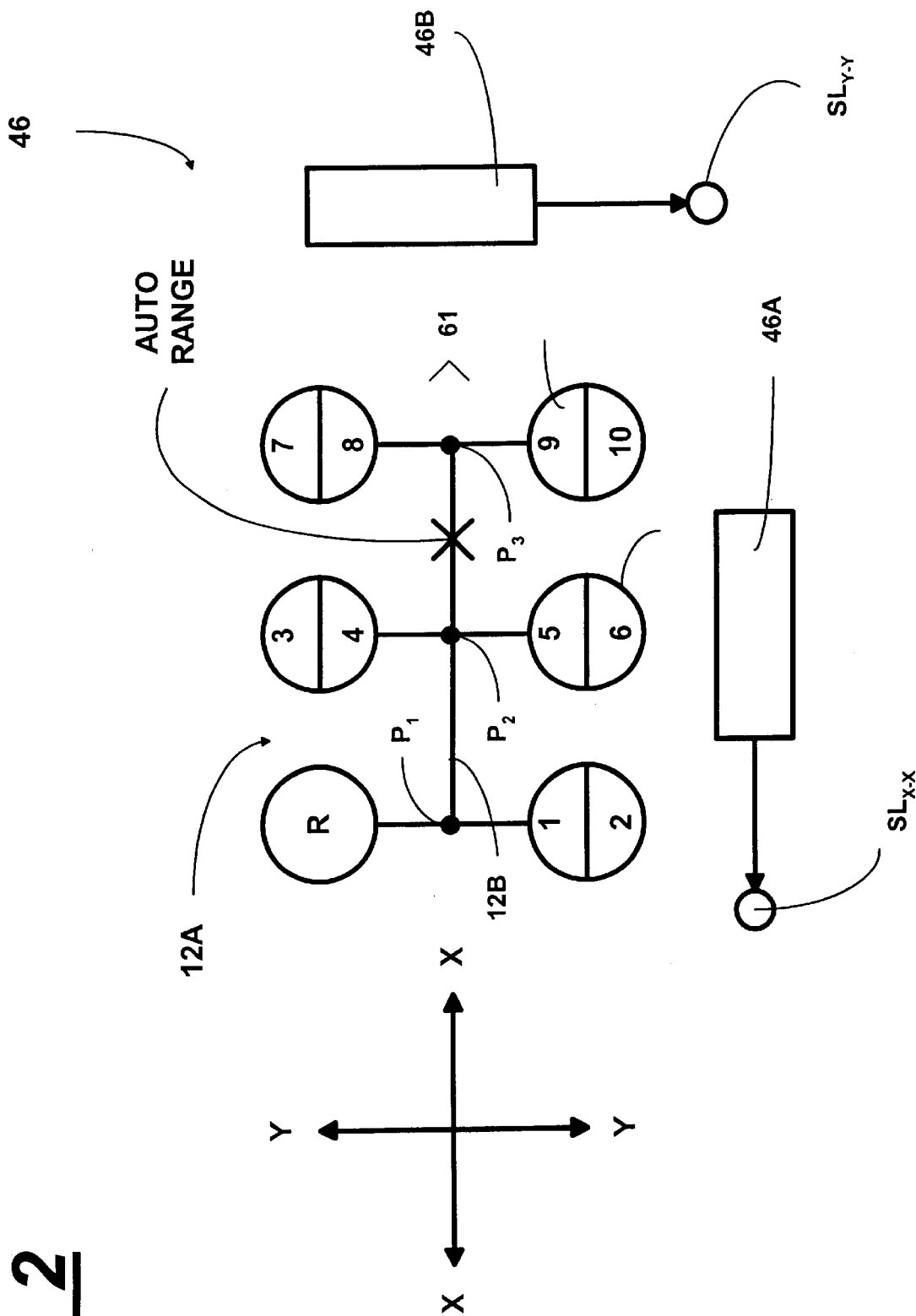

ADAPTIVE ENGINE CONTROL FOR SHIFTING TO NEUTRAL

RELATED APPLICATIONS

This application is related to U.S. Ser. No. 09/587,503, filed Jun. 25, 2000, titled ADAPTIVE CALIBRATION OF X-Y POSITION SENSOR, and assigned to Eaton Corporation, assignee of this application.

BACKGROUND OF THE INVENTION

1. Field of the Invention

The present invention relates to a method/system for utilizing a position sensor, such as a sensor for sensing the Y-Y position of a shift member in a vehicular transmission shifter, to determine the mode of engine fueling to be utilized to allow a shift to neutral without requiring disengagement of the vehicle master clutch. More particularly, the present invention relates to an adaptive technique utilizing a sensed rate of change in the Y-Y position of a shift member, such as a shift lever or shift finger movable in an "H-type" shift pattern or of an automated shift actuator, to determine if a forced torque reversal routine is necessary to allow a shift to neutral.

The present invention also relates to a method/system for causing engine torque to equal a value calculated to provide a zero driveline torque wherein, engine torque is changed at a rate which is a function of sensed throttle pedal position and/or engaged ratio.

2. Description of the Prior Art

Manually operated shift levers and X-Y shifters for moving a shift member, such as a shift finger or the like, in an H-type shift pattern are well known in the prior art, as may be seen by reference to U.S. Pat. Nos. 5,481,170; 5,281,902; 4,899,607; 4,821,590; 4,784,007; 4,455,883; and 4,515,029, the disclosures of which are incorporated herein by reference.

Position sensors of the discrete position type for sensing discrete X-Y positions of a shift member in an H-type shift pattern are known in the prior art, as may be seen by reference to U.S. Pat. Nos. 4,817,468 and 4,718,307. Sensors providing analog or digital signals, the magnitude of which are representative of the X-X and/or Y-Y position of a shift member in an H-type shift pattern and/or shaft force, are known in the prior art, as may be seen by reference to U.S. Pat. Nos. 5,911,787; 5,743,143; 5,481,170; and; 5,950,491, the disclosures of which are incorporated herein by reference. Sensors for sensing the position of other shift members, such as pistons, ball screw members and the like are also known in the prior art.

Fully or partially automated mechanical transmission systems that, upon determining that a shift from a currently engaged ratio into neutral and than into a target ratio is desirable, will, while maintaining the vehicle master friction clutch engaged, initiate automatic fuel control to cause reduced torque across the jaw clutches to be disengaged, are also known in the prior art as may be seen by reference to U.S. Pat. Nos. 4,850,236; 5,582,558; 5,735,771; 5,775,639; and 6,015,366, the disclosures of which are incorporated herein by reference.

These systems include systems that attempt to fuel the engine to achieve a zero driveline torque, see U.S. Pat. No. 4,593,580, the disclosure of which is incorporated herein by reference, and systems that fuel the engine to force one or more torque reversals, see U.S. Pat. No. 4,850,236.

Systems utilizing the engine fueling technique of forced torque reversals, especially repeated forced torque reversals, provide a highly reliable routine for allowing a shift to neutral, but may provide a somewhat less than desirable shift feel. Systems utilizing the engine fueling technique of aiming and attempting to remain at zero driveline torque provide a relatively high quality shift fuel, but did not provide desirable reliability of allowing an engaged jaw clutch to be acceptably disengaged.

SUMMARY OF THE INVENTION

In accordance with the present invention, an adaptive engine fueling control is provided which, based upon a sensed movement, preferably a rate of movement of a shift member, such as a shift lever in the Y-Y direction or the like, will utilize engine fueling to achieve the most appropriate (a) of aiming at a zero driveline torque, (b) or causing torque bumps to force torque reversals across the jaw clutch to be disengaged, or (c) a combination of thereof.

In a preferred embodiment, the above is accomplished by, upon determining that a shift into transmission neutral is required, causing the engine to be fueled to cause an output (flywheel) torque determined to cause a substantially zero driveline torque while monitoring shift member position. After a period of time, if the rate of change of the shift member position is greater than a reference value, than the desired substantially zero torque condition has been achieved (as expressed by the operator's ability to move the shift lever toward the Y-Y neutral position) and a torque bump routine to forced torque reversals is not required. If however, the shift member rate of movement is not at least equal to the reference value, than the torque bump routine may be necessary and will be initiated.

Accordingly, it is an object of the present invention to provide an improved method/system for adaptively controlling engine fueling to allow a shift into neutral without requiring master friction clutch to remain disengaged. The adaptive engine fuel control is a function of sensed change or rate of change of a shift member position, such as, for example, the Y-Y position of a shift member movable in an H-type shift pattern.

This and other objects and advantages of the present invention will become apparent from a reading of the following description of the preferred embodiment taken in connection with the attached drawings.

BRIEF DESCRIPTION OF THE DRAWINGS

FIG. 2 is a schematic illustration of an X-Y position sensor used in a preferred embodiment of the adaptive engine fueling control method/system of the present invention.

DESCRIPTION OF THE PREFERRED EMBODIMENT

Figure 1:
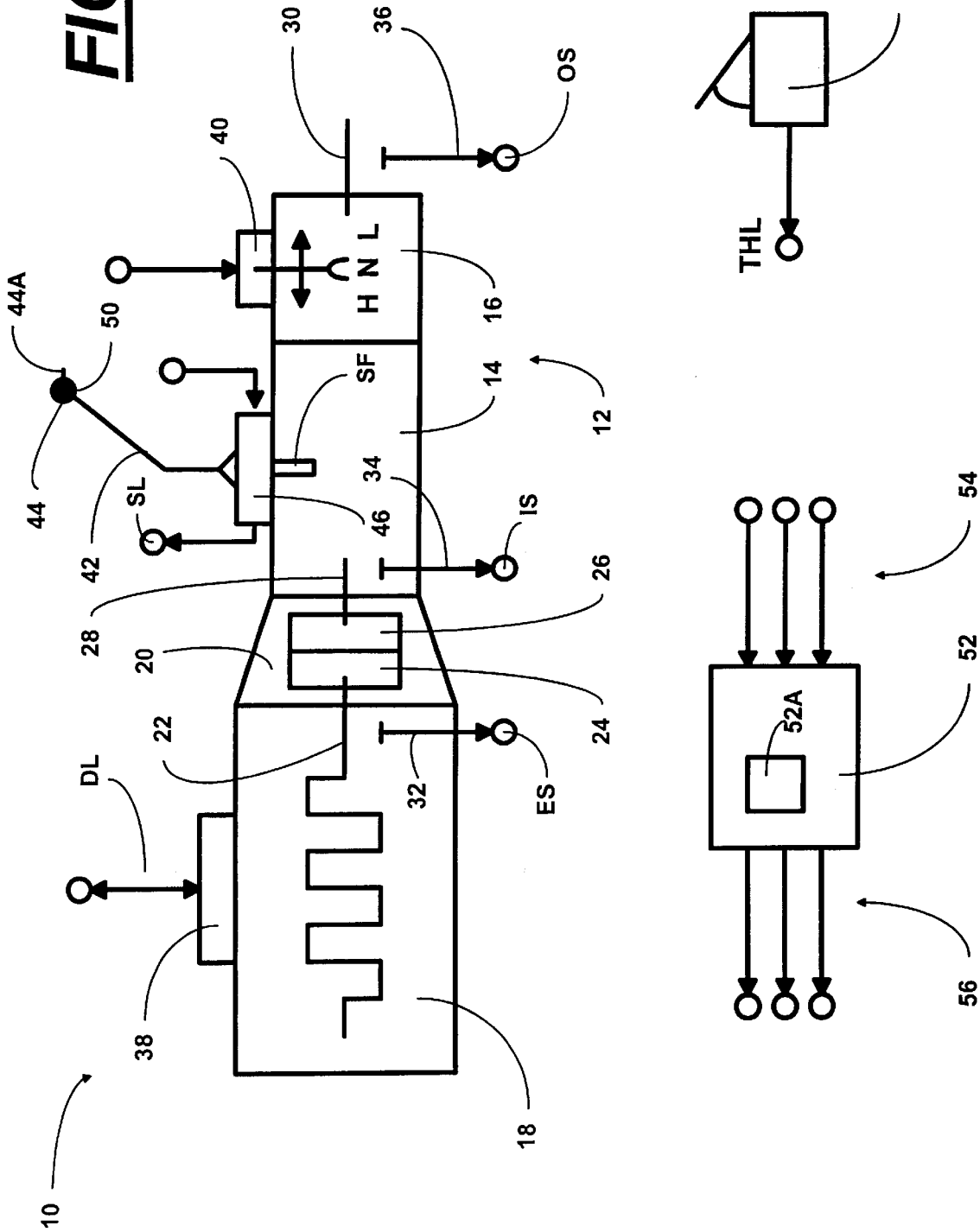
FIG. 1 is a schematic illustration of a vehicular drivetrain using the adaptive engine fueling control method/system of the present invention.

An at least partially automated vehicular drivetrain system 10 using the adaptive engine fueling control technique of the present invention is schematically illustrated in FIG. 1. System 10 may be fully automated, as seen by way of example in U.S. Pat. No. 4,361,060, partially automated, as seen by way of example in U.S. Pat. Nos. 4,648,290, and 5,409,432, or manual with controller assist, as seen by way of example in U.S. Pat. Nos. 4,850,236; 5,582,558; 5,735,771; and 6,015,366.

In system 10, a change-gear transmission 12 comprising a manually or automatically shifted main transmission section 14 connected in series with a splitter-type auxiliary transmission section 16 is drivingly connected to an internal combustion engine 18, such as a well-known gasoline or diesel engine, by a manually or automatically operated master friction clutch 20 or other non-positive coupling. Preferably, auxiliary transmission section 16 is of the three-layer, four-speed combined splitter/range type, as illustrated in U.S. Pat. Nos. 4,754,665 and 5,390,561, the disclosures of which are incorporated herein by reference.

Engine 18 includes a crankshaft 22, which is attached to a driving member 24 of master clutch 20, which is normally frictionally engaged with a driven member 26, which is attached to the input shaft 28 of the transmission. A transmission output shaft 30 extends from the auxiliary transmission section 16 for driving connection to the vehicular drive wheels, as through a drive axle or the like. For purposes of illustration, transmission 12 is illustrated as a (2+1)×(2)×(2) type transmission providing nine or ten selectable forward ratios, as may be seen by reference to the shift pattern 12A schematically illustrated in FIG. 2. Transmissions of this general type are well known in the prior art and are sold by the assignee of this application, EATON CORPORATION, under the trademark "Super-10" and may be seen in greater detail by reference to U.S. Pat. Nos. 6,015,366; 5,974,906; and 5,974,354, the disclosures of which are incorporated herein by reference.

The shift pattern 12A illustrated in FIG. 2 is of the well-known "H-type," comprising two or more vertical legs (R and 1st/2nd, 3rd/4th and 5th/6th, 7th/8th and 9th/10th) extending in the so-called "Y-Y" (or engaging/disengaging) direction, and a horizontal connecting leg 12B extending in the "X-X" (or selection) direction and located at a centered neutral position in the Y-Y direction.

As used herein, the term "H-type" shift pattern will refer to shift patterns wherein a shift member, such as a shift finger SF or the like, is (i) selectively movable in the X-X direction to align with a selected one of two or more legs extending in the Y-Y direction, (ii) movable in the Y-Y direction away or toward a centered neutral position, respectively, to engage or disengage selected gear ratios, and (iii) movable in the X-X direction between positions of alignment with selected legs only when in the neutral position in the Y-Y direction.

Controller-assisted transmission system 10 further includes rotational speed sensors 32 for sensing engine rotational speed (ES), 34 for sensing input shaft rotational speed (IS), and 36 for sensing output shaft rotational speed (OS), and providing signals indicative thereof. A sensor 37 provides a signal THL indicative of throttle pedal position. The signal is usually a percentage (0% to 100%) of fuel throttle position. Engine 18 may be electronically controlled, including an electronic controller 38 communicating over an electronic data link (DL) operating under an industry standard protocol such as SAE J-1922, SAE J-1939, ISO 11898 or the like. A manual clutch pedal (not shown) or an automated actuator (not shown) may be utilized to selectively engage and disengage normally engaged master clutch 20, as is well known in the prior art.

An auxiliary section actuator 40 is provided to control shifting of the auxiliary section splitter and/or range ratios. Preferably, at least the splitter actuator will be a three-position actuator, allowing the splitter section to be shifted to and maintained in a high splitter ratio, a low splitter ratio or a splitter-neutral position, the structure and advantages of which may be appreciated in greater detail by reference to U.S. Pat. Nos. 5,651,292; 5,974,906; and 5,970,810, the disclosures of which are incorporated herein by reference.

Transmission system 10 includes a manually operated shift lever 42 having a shift knob 44 thereon. Shift knob 44 may be of the type described in aforementioned U.S. Pat. No. 5,957,001. As is well known, shift lever 42 is manually manipulated in a known shift pattern (see FIG. 2) for selective engagement and disengagement of various shift ratios. Alternatively, an X-Y shift actuator, which by way of example may be of the types illustrated in U.S. Pat. Nos. 5,481,170; 5,281,902; 4,899,609; and 4,821,590, may be provided for automated or shift-by-wire shifting the transmission main section. Shift Knob 44 may include an intent to shift switch 44A by which the vehicle operator will request automatic engine fueling control to relieve torque lock and allow a shift to transmission neutral.

A position sensor assembly 46 is operable to sense the X-Y position of the shift lever in the shift pattern and to provide signals (SL) indicative thereof. X-Y position sensors of this type are known in the prior art and examples thereof may be seen by reference to U.S. Pat. Nos. 5,743,143; 5,894,758; 5,950,491; and 5,911,787, the disclosures of which are incorporated herein by reference. Sensor assembly 46 is illustrated in FIG. 2 and described in greater detail below.

System 10 includes a control unit, preferably a microprocessor-based control unit of the type illustrated in U.S. Pat. Nos. 4,595,986; 4,361,065; and 5,335,566, the disclosures of which are incorporated herein by reference, for receiving input signals 54 and processing same according to predetermined logic rules to issue command output signals 56 to system actuators, such as engine controller 38, auxiliary section shift actuator 40, and the like.

Sensor assembly 46 includes a first sensing member 46A for providing a first signal $SL_{x-x}$ having a magnitude indicative of the X-X position of the shift member in the H-type shift pattern and a second sensor 46B for providing a second signal $SL_{Y-Y}$ having a magnitude indicative of the Y-Y position of the shift member in the shift pattern.

Sensor members 46A and 46B may provide signals which vary in magnitude as to frequency, amplitude, voltage, current, pressure or the like with positions sensed thereby. U.S. Pat. No. 5,743,143 and European Pat. No. 0371975 illustrate typical displacement sensing devices.

Although X-X and Y-Y movements are illustrated as generally perpendicular axial movements, an axial and a rotational movement (as illustrated in U.S. Pat. Nos. 5,743,143 and 5,911,787) are also intended to be included as X-X and Y-Y movements.

Figure 3:
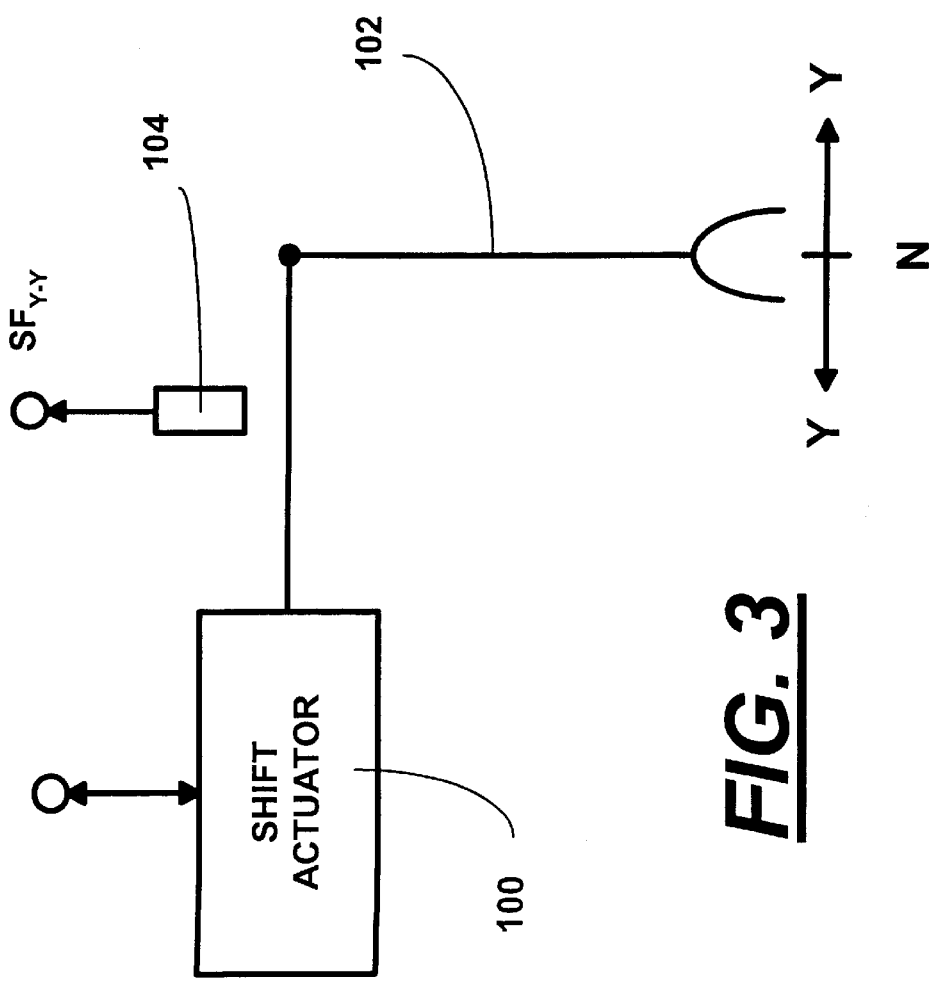
FIG. 3 is schematic illustration of an automated shift actuator for use in an alternate embodiment of the present invention.

FIG. 3 illustrates an alternate embodiment wherein a shift actuator 100 acts under command from the ECU 52 to cause the shift fork 102 to move in the Y-Y direction for selectively engaging and disengaging jaw clutches (not shown). A sensor 104 will provide signals $SF_{Y-Y}$ indicative of the sensed position of the shift fork and associated shift members.

Figure 1A:
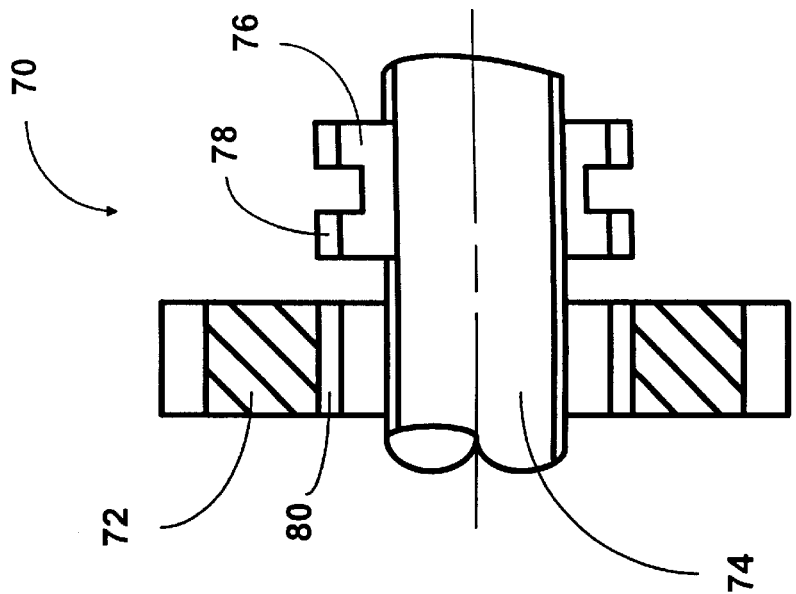
FIG. 1A is a schematic illustration of a typical jaw clutch assembly utilized with a mechanical transmission.

FIG. 1A illustrates a typical jaw clutch assembly 70 for selectively engaging and disengaging a gear 72 to a shaft 74, such as a transmission main shaft, for engaging and disengaging a transmission ratio. Briefly, clutch member 76 is splined to shaft 74 for axial movement relative thereto and rotation therewith. Clutch member 76 carries external clutch teeth 78 for engaging internal clutch teeth 80 formed in the inner diameter bore of gear 72. The clutch member 76 is axially positioned by a shift fork (not shown) or the like. The shift fork is typically axially positioned by a shift rail, a shift shaft, a ball ramp or ball screw, a piston, or functionally similar device.

As is known, to disengage a jaw clutch in a vehicular mechanical transmission, especially in a heavy-duty vehicle, it is necessary to relieve torque lock at the engaged jaw clutch. If opening the master clutch 20 is not achievable or desirable, torque lock can be relieved by fueling the engine to cause assumed zero driveline torque and/or by forcing torque reversals which will positively cause crossings of zero driveline torque. While controlling engine fueling to aim and remain at a zero driveline torque value will result in a higher quality shift, this method may not result in actually allowing engaged jaw clutches underload to be disengaged. Using a "torque bump" or other routine to forced torque reversals across the jaw clutch to be disengaged is highly reliable, but may result in a relatively lower quality shift.

Control of engine torque to achieve a desired output or flywheel torque is known as and may be seen by reference U.S. Pat. No. 5,620,392, the disclosure of which is incorporated herein by reference.

Engine torque as used herein refers to a value indicative of an engine torque, usually gross engine torque, from which an output or flywheel torque may be calculated or estimated. The relationship of gross engine torque to flywheel torque is discussed in U.S. Pat. Nos. 5,509,867 and 5,490,063, the disclosures of which are incorporated herein by reference.

One or more engine torque value may be commanded on, or read from, an industry standard data link, DL, such as an SAE J-1922, SAE J-1939 or ISO11898 compliant datalink.

According to the present invention, upon sensing that a shift from an engaged ratio to neutral, without disengaging the master clutch 20, is required, the engine is first commanded to ramp to a value of engine torque determined or calculated, based upon sensed system operating parameters, to correspond to zero driveline torque.

Figure 4:
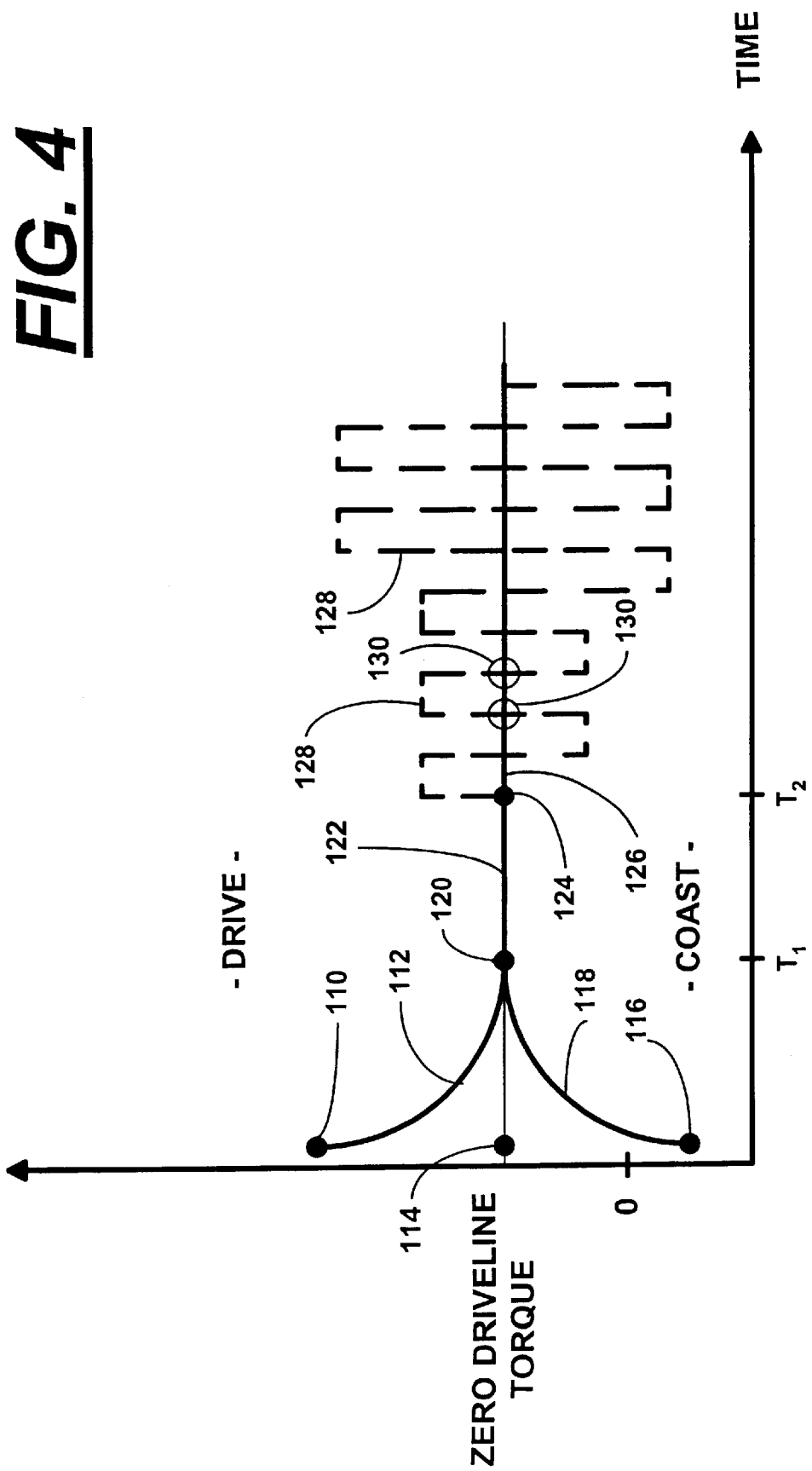
FIG. 4 is a graphical representation of the engine fuel control of the present invention.

Referring to FIG. 4, if the shift initiates at a drive condition 110, the engine torque will be commanded to ramp down 112 to the calculated value 114 assumed to correspond to the zero driveline torque condition. Similarly, if the shift to neutral initiates at a coast condition 116, the engine torque will be commanded to ramp up 118 to the calculated value 114. Preferably, the slope of the ramps 112 and 116 (i.e., the rate of change of engine torque) will be functions of the ratio being disengaged and/or current throttle position THL. Upon achieving the assumed zero driveline torque condition 120 (at time $T_1$) the engine will be commanded to remain at this condition 122 for a period of T time $(T_2-T_1)$. The period of time $(T_2-T_1)$ is typically about 150–300 milliseconds. At expiration of that period of time 124, the sensed velocity of a shift member, such as for example, a shift lever 42 or shift finger SF, is compared to a reference value REF. If the shift member velocity equals or exceeds the reference value $((d/dt(SL_{Y\text{-}Y}))>REF)$, this indicates that the shift member is moving at a rate towards jaw clutch disengagement indicative of non-torque lock conditions and a torque bump routine is not necessary or desirable. In such conditions, the engine will be commanded to continue generating an output torque assumed to correspond to zero driveline torque (solid line 126) until transmission neutral is sensed.

If the sensed shift member velocity does not equal or exceed the reference value $((d/dt(SL_{Y\text{-}Y})<REF)$, than torque lock conditions may exist and a torque bump fueling routine of the engine (dashed lines 128) to forced torque reversals (130) at the jaw clutch will commence until neutral is sensed and/or a time period expires. The magnitude and/or shape of the torque bumps 128 may vary with time.

Figure 5:
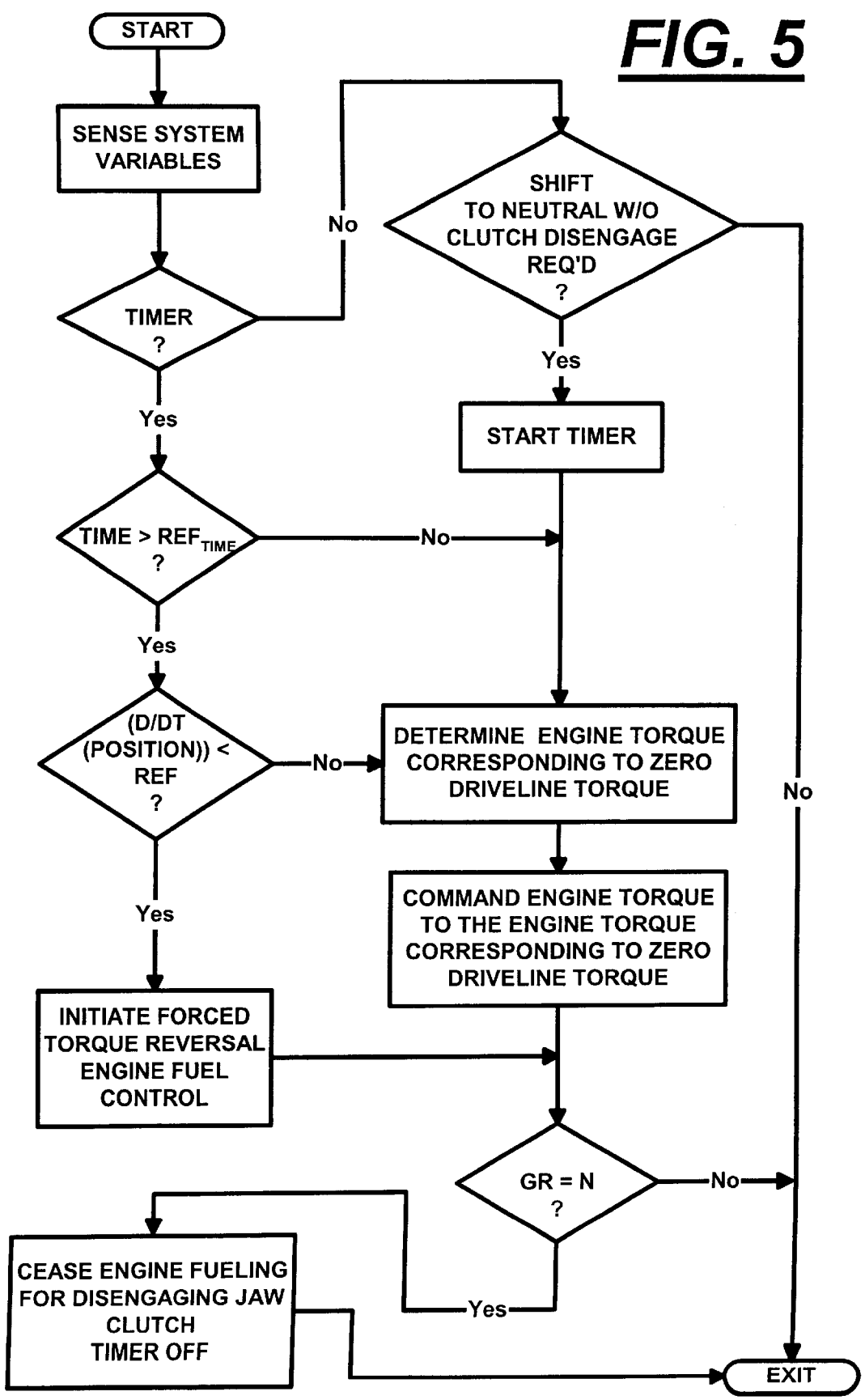
FIG. 5 is a schematic illustration, in flow chart format, of the adaptive engine fuel control method/system of the present invention.

FIG. 5 is a schematic illustration, in flow chart format, of the adaptive engine fueling control subroutine of the present invention. Preferably, the subroutine will be performed during each control loop.

While velocity of a shift member is utilized, by way of example, to determine if aiming at zero torque fuel control is achieving its relieving of torque lock purposes, other parameters such as a force, current, voltage drop, pressure at an actuator or the like may be monitored to determine if the existence of torque lock conditions at the jaw clutch to be disengaged are or are not indicated.

If a position or other shift member monitoring sensors are not available, a failure to achieve neutral may be used as an indication that torque lock conditions may exist and a torque bump routine is necessary.

Figure 6A:
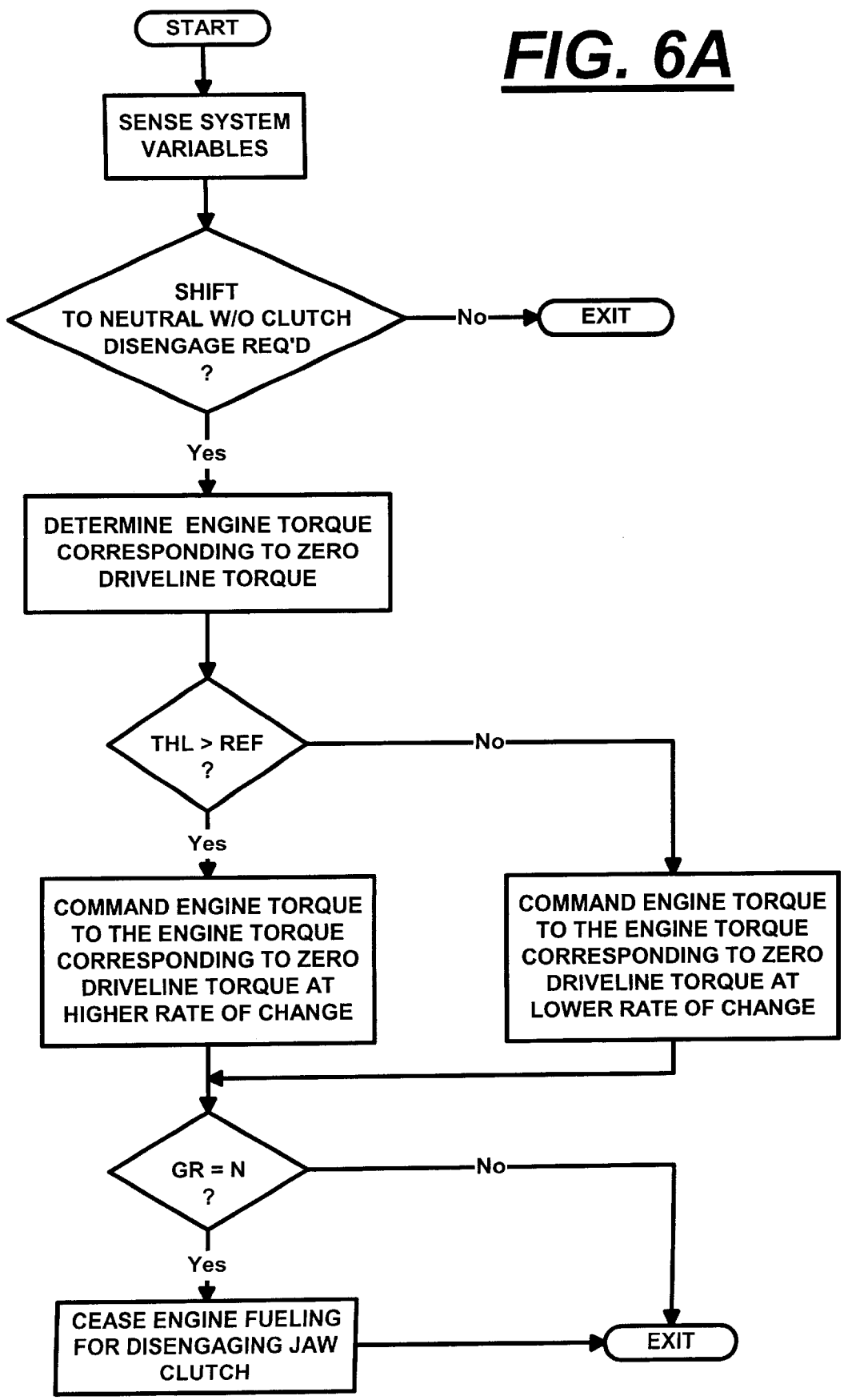
FIGS. 6A and 6B are schematic illustrations, in flowchart format, of further embodiments of the adaptive engine fueling control method/system of the present invention.
Figure 6B:
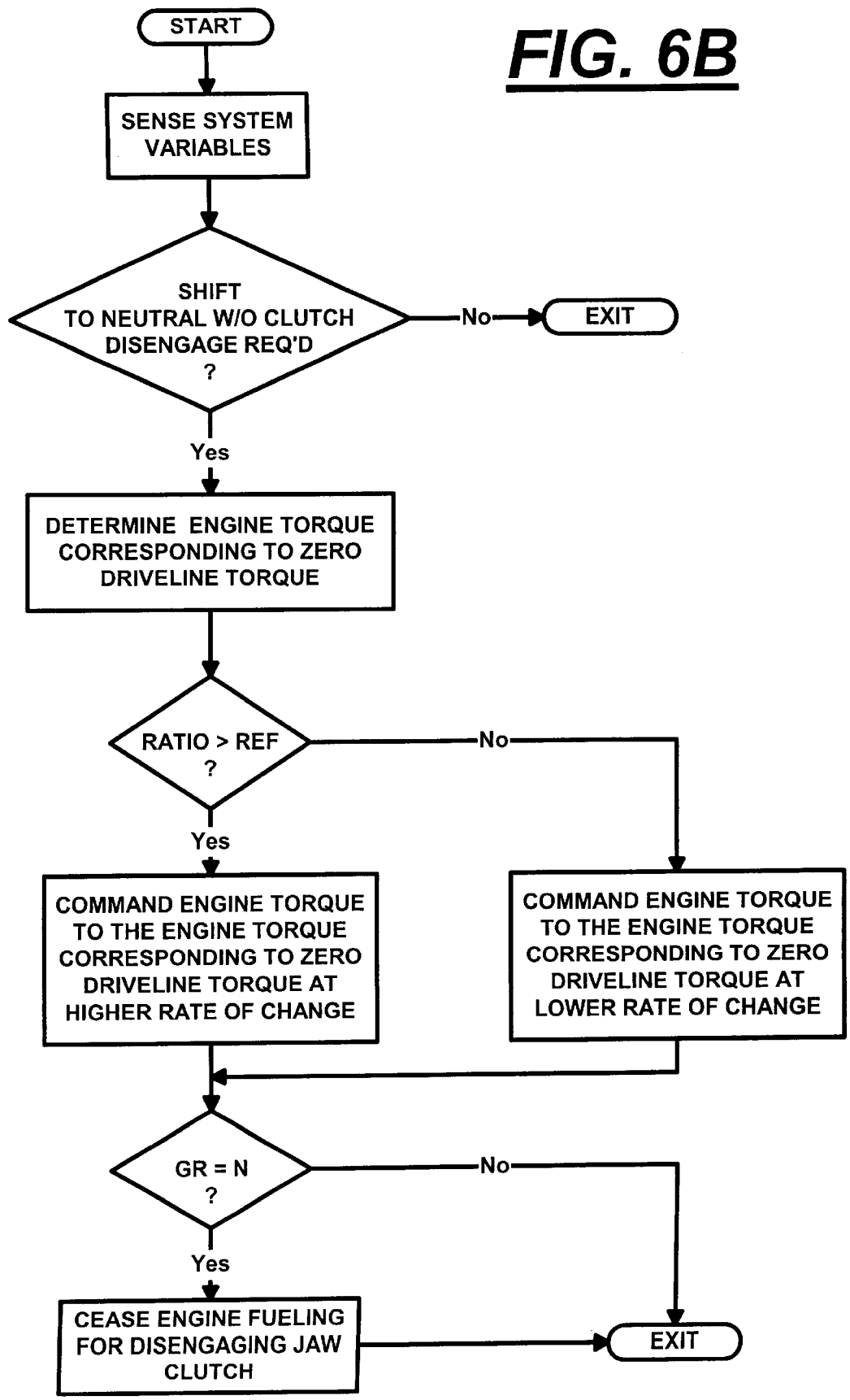

FIGS. 6A and 6B are schematic illustrations, in flow chart format, of further embodiments of the adaptive engine fueling control method/system of the present invention.

In the preferred embodiment of the present invention, if throttle is higher and/or if engaged in a higher ratio (such as in 8th, 9th, or 10th speed in a 10-speed transmission) the ramp rate (i.e., rate of change of engine torque) will be greater than if at low throttle or in a lower ratio (1st, 2nd, or 3rd in a 10-speed transmission).

The present invention is intended to be applicable to manual shifting of a main transmission section and/or actuator shifting of a main and/or auxiliary transmission section.

Accordingly, it may be seen that a new and improved system/method for adaptively controlling engine fueling while disengaging a jaw clutch with the master friction clutch engaged is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches having a jaw clutch member (76) movable by a shift member (42, SF, 102) to a selected one of an engaged and a disengaged position, an engine fuel controller (38) for controlling fueling of the engine, and a system controller (52) for receiving input signals (54) including at least one of signals indicative of engine speed (ES), input shaft speed (IS), an operator throttle setting (THL), master friction clutch engagement, shift member position ($SL_{Y\text{-}Y}$, $SF_{Y\text{-}Y}$) and an engaged gear ratio (IS/OS), and to process said input signals in accordance with logic rules to issue command output signals (56) to system actuators including said fuel controller, said method comprising the steps of, upon determining a requirement to disengage an engaged jaw clutch while retaining the master friction clutch engaged,
  determining a target engine torque corresponding to a substantially zero torque across the engaged jaw clutch,
  commanding said engine to be fueled so that engine torque equals said target engine torque;
  sensing for an absence of torque lock conditions at said engaged jaw clutch,
  after said engine torque has equaled said target engine torque for a predetermined period of time ($T_2-T_1$), (i) if an absence of torque lock conditions at said jaw clutch is not sensed, commanding said engine to be fueled to cause forced torque reversals (128, 130) across said engaged jaw clutch, and (ii) if an absence of torque lock conditions at said engaged jaw clutch is sensed, causing said engine torque to continue to equal said target engine torque value until disengagement of said jaw clutch is sensed.

2. The method of claim 1 wherein said input signals include a signal indicative of shift member position and said absence of torque lock conditions is sensed if said shift member position has one of (i) a change and (ii) a rate of change exceeding a reference value.

3. The method of claim 1 wherein said engine and said system controller and said system controller communicate over an electronic data link.

4. The method of claim 3 wherein said data link conforms with the SAE J1939 protocol.

5. A method for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches having a jaw clutch member (76) axially movable by a shift member (42, SF, 102), an engine fuel controller (38) for controlling fueling of the engine, and a system controller (52) for receiving input signals (54) including at least signals indicative of, shift member position ($SL_{Y-Y}$, $SF_{Y-Y}$), and to process said input signals in accordance with logic rules to issue command output signals (56) to system actuators including said fuel controller, said method comprising the steps of, upon determining a requirement to disengage an engaged jaw clutch while retaining the master friction clutch engaged,
  determining a target engine torque (114) corresponding to a substantially zero torque across the engaged jaw clutch,
  commanding said engine to be fueled so that engine torque equals said target engine torque;
  after engine torque equals said target engine torque for a predetermined period of time, comparing a control parameter indicative of one of a) a change in shift member position and b) a rate of change in shift member position to a reference value (REF), and
  if said control parameter is at least equal to said reference value, causing engine torque to equal said target engine torque,
  if said control parameter is less than said reference value, causing said engine to be fueled to cause forced torque reversals (128, 130) across the engaged jaw clutch.

6. A method for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches having a jaw clutch member (76) movable to engaged and disengaged positions by a shift member (42, SF, 102), an engine fuel controller (38) for controlling fueling of the engine, and a system controller (52) for receiving input signals (54) including a signal indicative of an operator throttle setting (THL) and at least one of signals indicative of engine speed (ES), input shaft speed (IS), master friction clutch engagement, shift member position ($SL_{Y-Y}$, $SF_{Y-Y}$) and an engaged gear ratio (IS/OS), and to process said input signals in accordance with logic rules to issue command output signals (56) to system actuators including said fuel controller, said method comprising the steps of, upon determining a requirement to disengage an engaged jaw clutch while retaining the master friction clutch engaged:
  determining a target engine torque corresponding to a substantially zero torque across the engaged jaw clutch, and
  commanding said engine to be fueled so that engine torque changes from an initial value to said target engine torque at a rate of change dependent upon sensed throttle pedal position.

7. The method of claim 6 wherein the absolute value of said rate of change is greater at highest values of throttle pedal position than at lowest values of throttle position.

8. A method for controlling engine fueling in a vehicular automated transmission system comprising an internal combustion engine (18) driving an input shaft (18) of a multiple ratio transmission (12) through a master friction clutch (20), said transmission having an output shaft (30) and at least two ratios engaged and disengaged by positive jaw clutches having a jaw clutch member (76) movable to engaged and disengaged positions by a shift member (42, SF, 102), an engine fuel controller (38) for controlling fueling of the engine, and a system controller (52) for receiving input signals (54) including a signal indicative of engaged gear ratio (IS/OS) and a signal indicative of an operator throttle setting (THL) and at least one of signals indicative of engine speed (ES), input shaft speed (IS), master friction clutch engagement and, shift member position ($SL_{Y-Y}$, $SF_{Y-Y}$), and to process said input signals in accordance with logic rules to issue command output signals (56) to system actuators including said fuel controller, said method comprising the steps of, upon determining a requirement to disengage an engaged jaw clutch while retaining the master friction clutch engaged:
  determining a target engine torque corresponding to a substantially zero torque across the engaged jaw clutch, and
  commanding said engine to be fueled so that engine torque changes from an initial value to said target engine torque at a rate of change dependent upon sensed engaged gear ratio.

9. The method of claim 8 wherein the absolute value of said rate of change is greater at lowest ratios of input shaft speed to output shaft speed than at highest ratios of input shaft speed to output shaft speed.

10. A control system for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches having a jaw clutch member (76) movable by a shift member (42, SF, 102) to a selected one of an engaged and a disengaged position, an engine fuel controller (38) for controlling fueling of the engine, and a system controller (52) for receiving input signals (54) including at least one of signals indicative of engine speed (ES), input shaft speed (IS), an operator throttle setting (THL), master friction clutch engagement, shift member position ($SL_{Y-Y}$, $SF_{Y-Y}$) and an engaged gear ratio (IS/OS), and to process said input signals in accordance with logic rules to issue command output signals (56) to system actuators including said fuel controller, said control system characterized by said logic rules including rules effective, upon determining a requirement to disengage an engaged jaw clutch while retaining the master friction clutch engaged, for:

determining a target engine torque corresponding to a substantially zero torque across the engaged jaw clutch, commanding said engine to be fueled so that engine torque equals said target engine torque;

sensing for an absence of torque lock conditions at said engaged jaw clutch, after said engine torque has equaled said target engine torque for a predetermined period of time ($T_2$-$T_1$), (i) if an absence of torque lock conditions at said jaw clutch is not sensed, commanding said engine to be fueled to cause forced torque reversals (128, 130) across said engaged jaw clutch, and (ii) if an absence of torque lock conditions at said engaged jaw clutch is sensed, causing said engine torque to continue to equal said target engine torque value until disengagement of said jaw clutch is sensed.

11. The control system of claim 10 wherein said input signals include a signal indicative of shift member position and said absence of torque lock conditions is sensed if said shift member position has one of (i) a change and (ii) a rate of change exceeding a reference value.

12. The control system of claim 10 wherein said engine and said system controller and said system controller communicate over an electronic data link.

13. The control system of claim 12 wherein said data link conforms with the SAE J1939 protocol.

14. A control system for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches having a jaw clutch member (76) axially movable by a shift member (42, SF, 102), an engine fuel controller (38) for controlling fueling of the engine, and a system controller (52) for receiving input signals (54) including at least signals indicative of, shift member position ($SL_{Y-Y}$, $SF_{Y-Y}$), and to process said input signals in accordance with logic rules to issue command output signals (56) to system actuators including said fuel controller, said control system characterized by said logic rules including rules effective, upon determining a requirement to disengage an engaged jaw clutch while retaining the master friction clutch engaged, for:

determining a target engine torque (114) corresponding to a substantially zero torque across the engaged jaw clutch, commanding said engine to be fueled so that engine torque equals said target engine torque;

after engine torque equals said target engine torque for a predetermined period of time, comparing a control parameter indicative of one of a) a change in shift member position and b) a rate of change in shift member position to a reference value (REF), and if said control parameter is at least equal to said reference value, causing engine torque to equal said target engine torque, if said control parameter is less than said reference value, causing said engine to be fueled to cause forced torque reversals (128, 130) across the engaged jaw clutch.

15. A control system for controlling engine fueling in a vehicular automated transmission system comprising an internal combustion engine (18) driving an input shaft (18) of a multiple ratio transmission (12) through a master friction clutch (20), said transmission having at least two ratios engaged and disengaged by positive jaw clutches having a jaw clutch member (76) movable to engaged and disengaged positions by a shift member (42, SF, 102), an engine fuel controller (38) for controlling fueling of the engine, and a system controller (52) for receiving input signals (54) including a signal indicative of an operator throttle setting (THL) and at least one of signals indicative of engine speed (ES), input shaft speed (IS), master friction clutch engagement, shift member position ($SL_{Y-Y}$, $SF_{Y-Y}$) and an engaged gear ratio (IS/OS), and to process said input signals in accordance with logic rules to issue command output signals (56) to system actuators including said fuel controller, said logic rules including rules effective, upon determining a requirement to disengage an engaged jaw clutch while retaining the master friction clutch engaged for:

determining a target engine torque corresponding to a substantially zero torque across the engaged jaw clutch, and commanding said engine to be fueled so that engine torque changes from an initial value to said target engine torque at a rate of change dependent upon sensed throttle pedal position.

16. The control system of claim 15 wherein the absolute value of said rate of change is greater at highest values of throttle pedal position than at lowest values of throttle position.

17. A method for controlling engine fueling in a vehicular automated transmission system comprising an internal combustion engine (18) driving an input shaft (18) of a multiple ratio transmission (12) through a master friction clutch (20), said transmission having an output shaft (30) and at least two ratios engaged and disengaged by positive jaw clutches having a jaw clutch member (76) movable to engaged and disengaged positions by a shift member (42, SF, 102), an engine fuel controller (38) for controlling fueling of the engine, and a system controller (52) for receiving input signals (54) including a signal indicative of engaged gear ratio (IS/OS) and a signal indicative of an operator throttle setting (THL) and at least one of signals indicative of engine speed (ES), input shaft speed (IS), master friction clutch engagement and, shift member position ($SL_{Y-Y}$, $SF_{Y-Y}$), and to process said input signals in accordance with logic rules to issue command output signals (56) to system actuators including said fuel controller, said logic rules including rules effective, upon determining a requirement to disengage an engaged jaw clutch while retaining the master friction clutch engaged for:

determining a target engine torque corresponding to a substantially zero torque across the engaged jaw clutch, and commanding said engine to be fueled so that engine torque changes from an initial value to said target engine torque at a rate of change dependent upon sensed engaged gear ratio.

18. The control system of claim 17 wherein the absolute value of said rate of change is greater at lowest ratios of input shaft speed to output shaft speed than at highest values input shaft speed to output shaft speed.

* * * * *